Figure 1:
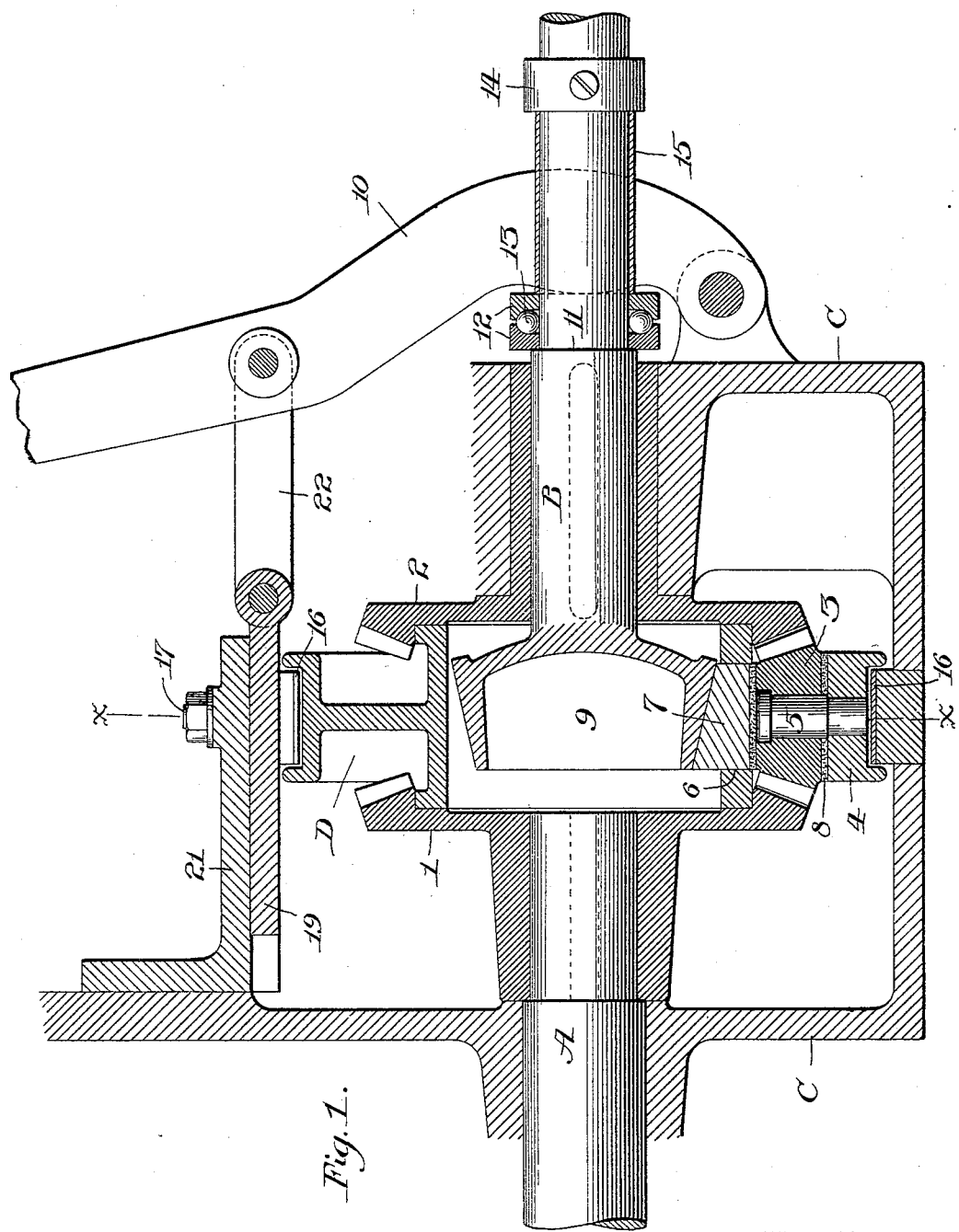

No. 632,886. Patented Sept. 12, 1899.
V. V. TORBENSEN.
GEARING.
(Application filed Aug. 19, 1898.)
(No Model.) 2 Sheets—Sheet 1.

WITNESSES: INVENTOR
A. V. Groupe Viggo V. Torbensen
John R. Nolan By
ATTORNEY.

No. 632,886. Patented Sept. 12, 1899.
V. V. TORBENSEN.
GEARING.
(Application filed Aug. 19, 1898.)
(No Model.) 2 Sheets—Sheet 2.
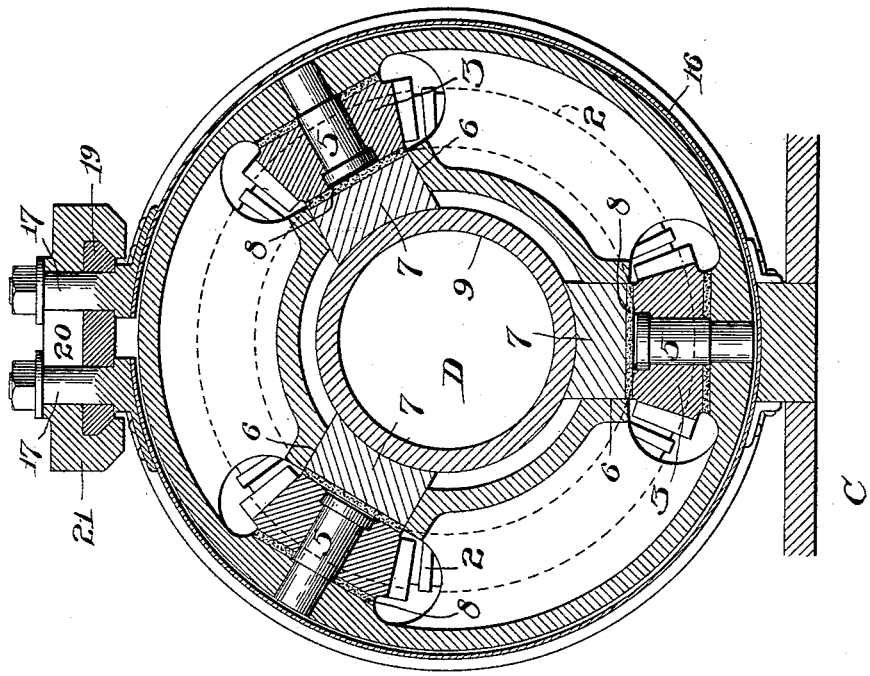
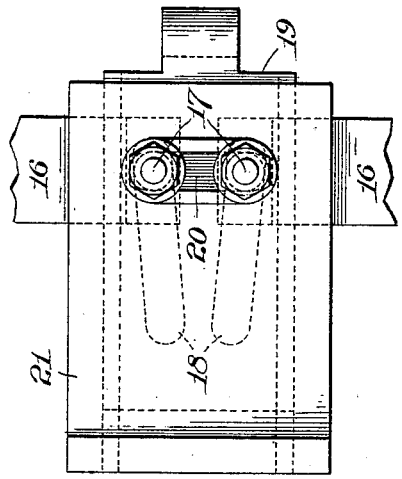
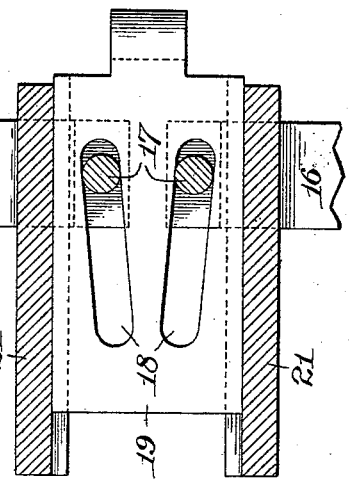
WITNESSES:
INVENTOR
Viggo V. Torbensen
BY
ATTORNEY.

UNITED STATES PATENT OFFICE.

VIGGO V. TORBENSEN, OF WESTVILLE, NEW JERSEY, ASSIGNOR TO GEORGE T. HARRIS, OF PHILADELPHIA, PENNSYLVANIA.

GEARING.

SPECIFICATION forming part of Letters Patent No. 632,886, dated September 12, 1899.

Application filed August 19, 1898. Serial No. 688,983. (No model.)

*To all whom it may concern:*

Be it known that I, VIGGO V. TORBENSEN, a citizen of the United States, residing at Westville, in the county of Gloucester and State of New Jersey, have invented certain new and useful Improvements in Gearing, of which the following is a full, clear, and exact description, reference being had to the accompanying drawings, forming a part of this specification.

The object of this invention is to provide a gear mechanism of simple and efficient construction whereby two shafts may be coupled together and either direct or reverse motion transmitted from the driving to the driven shaft at will, and this without changing the direction of rotation of the former shaft.

The invention, as generally stated, consists in the combination with the driving and driven shafts of an interposed rotatable gear-case carrying a set of relatively-disposed pinions with which coact gear-wheels on the respective shafts, clamping-blocks in said case adapted to coact with the pinions to lock or release the same, means whereby said blocks are actuated, and means whereby the case is locked or released at predetermined intervals.

The invention also comprehends novel features of construction and organization of parts which will be hereinafter described and claimed.

In the drawings, Figure 1 is a longitudinal vertical section of my improved clutch. Fig. 2 is a transverse section, as on the line $x\ x$ of Fig. 1. Fig. 3 is a plan of the brake-actuating device. Fig. 4 is a horizontal section thereof.

A B represent the driving and driven shafts, respectively, the same having their bearings in the frame C.

D is the clutch mechanism interposed between the shafts and operatively connected therewith, which mechanism is of the following construction: On the inner ends of the shafts A B are two oppositely-disposed bevel gear-wheels 1 2, respectively, one of which, 1, is keyed fast to the driving-shaft, while the other is splined to the driven shaft, so as to permit longitudinal movement of the latter shaft. These wheels coact with a series of bevel pinions 3, arranged at intervals apart within a rotatable case 4. In the present instance there are three relatively-disposed pinions mounted on radial stud-shafts 5, so as to have slight radial movement as well as rotary movement thereon.

Within the casing, at points adjacent to the respective pinions, are formed guideways 6, to which are fitted radially-movable blocks 7, that may be forced against the opposing faces of the pinions in a manner to lock the latter from rotating by friction. The pinions are preferably lined with hard fiber washers 8 to insure increased friction between the coacting surfaces. The inner faces of the blocks are beveled correspondingly with the opposing face of a cone 9 on the end of the driven shaft. A hand-lever 10 is fulcrumed to the frame at a point adjacent to the shaft and is adapted when properly operated to advance the shaft, and thereby force the cone against the beveled faces of the blocks with the effect stated.

In the present instance a shoulder 11 is formed on the driven shaft and a pair of rings 12 applied thereto, with interposed antifriction-balls 13. A collar 14 is affixed to the shaft and a sleeve 15 loosely applied to the latter intermediate the collar and the outer ring, whereby the two rings, with their balls, are held in place. The lever when thrown forward takes against the face of the outer ring and advances the shaft and cone, the ball-bearing connection materially reducing the friction between the rotating shaft and the stationary lever.

Encircling the periphery of the gear-case is a brake-band 16, that may be rendered active or idle through the operation of the lever 10, with which it is connected. In this case the meeting ends of the band are equipped with vertical studs 17, which extend through converging slots 18 in a slide-plate 19 and also through a transverse guide-slot 20 in an overlying plate or bracket 21, to which the slide is fitted, whereby the pins will be drawn together in a manner to tighten the band on the gear-case when the slide is moved in one direction and conversely when the slide is retracted. The slide-plate is connected with the lever by a link 22 to the end that when the lever is actuated to clamp the pinions, as above stated, the band is released, and when oppositely moved the pinions are released and the brake-band tightened.

The operation may be briefly described as follows: Assuming the driving-shaft to be in motion, if the lever occupy the middle position the cone, as well as the brake-band, is disengaged from the gear-case, the only effect of the rotation of the shaft and its gear 1 being to rotate the gear-case, while the pinions roll idly on the gear 2, which, with its shaft, remains stationary. If the lever be moved forward the cone will be advanced thereby to force the blocks upon the opposing pinions, and the friction set up by the faces of the pinions against the faces of the blocks and gear-case will lock the pinions in position, the whole clutch mechanism, including the case D, pinion 3, gear 2, and cone 9, thus becoming a unit and revolving the driven shaft correspondingly with the driver. If the lever be thrown backward, the pressure upon the pinions will be released and the brake-band tightened upon the gear-case, so as to hold the same, in consequence of which the pinions will be revolved by the gear 1 and in turn rotate the gear 2 and shaft B in a direction opposite to that of the driving-shaft.

It will be seen that by reason of the position and arrangement of the points of contact in the construction above described comparatively little pressure and friction are needed to lock the pinions in position. In clutches of prior construction the friction is had on the conical end of the shaft, and hence when considerable power is transmitted the clutch is apt to slip, thereupon becoming hot and cutting and finally setting itself fast. This objection is entirely obviated by my construction in that the friction necessary to lock the pinions is much less than that required from the cone alone, and in consequence the clutch can slip to any extent without liability of cutting.

I claim as my invention—

1. In gearing, of the class described, the combination with two shafts, and the gears thereon, of an intermediate rotatable support, a series of pinions thereon coacting with said gears, clamp-blocks arranged to engage said pinions to hold them from rotation, and means for positively actuating said blocks to cause their engagement with said pinions, and brake means for said support, substantially as specified.

2. In gearing of the class described, the combination with two shafts, and the gears thereon, of an intermediate rotatable support, a series of pinions loosely mounted on said support, and engaged with said gears, radially-movable clamp-blocks, and means carried by one of said shafts within said support for positively actuating said blocks, and brake means for said support, substantially as specified.

3. In gearing of the class described, the combination with two shafts, and the gears thereon, of an intermediate rotatable support having radial studs, a series of pinions loosely mounted on said studs and engaged with said gears, radially - movable clamp-blocks arranged to frictionally engage the faces of said pinions, means carried by one of said shafts within the said support for actuating said clamp-blocks, and a brake device for said support, substantially as specified.

4. In gearing of the class described, the combination with two shafts, the gears thereon, and the cone on one of said shafts, of the rotatable case, the pinions therein coacting with said gears, the clamp-blocks intermediate said pinions and the cone, a brake for said case, and means for concertedly operating said brake and cone.

5. In gearing of the class described, the combination with two shafts, the gears thereon, and the cone on one of said shafts, of the rotatable case, the brake-band thereon, the pinions in said case coacting with said gears, the clamp-blocks intermediate said pinions and the cone, and means for concertedly operating said brake-band and the cone.

6. In gearing of the class described, the combination with two shafts and the gears thereon, of the rotatable case, the brake-band thereon, the pinions, the clamp-blocks, actuating means for said blocks, a lever, connections between the same and said actuating means, and connections between said lever and the brake-band.

7. In gearing of the class described, the combination with two shafts, and the gears thereon, of an intermediate rotatable support, pinions loosely journaled on said support and engaged with said gears, a clamp-actuating device on one of said shafts within said support, clamp-blocks intermediate the pinions and the said clamp-actuating device, and a brake device for said support, substantially as specified.

8. In gearing of the class described, the combination with two shafts, the gears thereon, and the cone on one of said shafts, of a rotatable support intermediate the said gears, pinions journaled to said support and engaged with said gears, clamp-blocks intermediate the pinions and the cone, means for actuating the said cone to cause the operation of said blocks, and a brake device for said support, substantially as specified.

In testimony whereof I have hereunto affixed my signature this 5th day of August, A. D. 1898.

VIGGO V. TORBENSEN.

Witnesses:
JOHN R. NOLAN,
HECTOR T. FENTON.